Patented Feb. 12, 1935

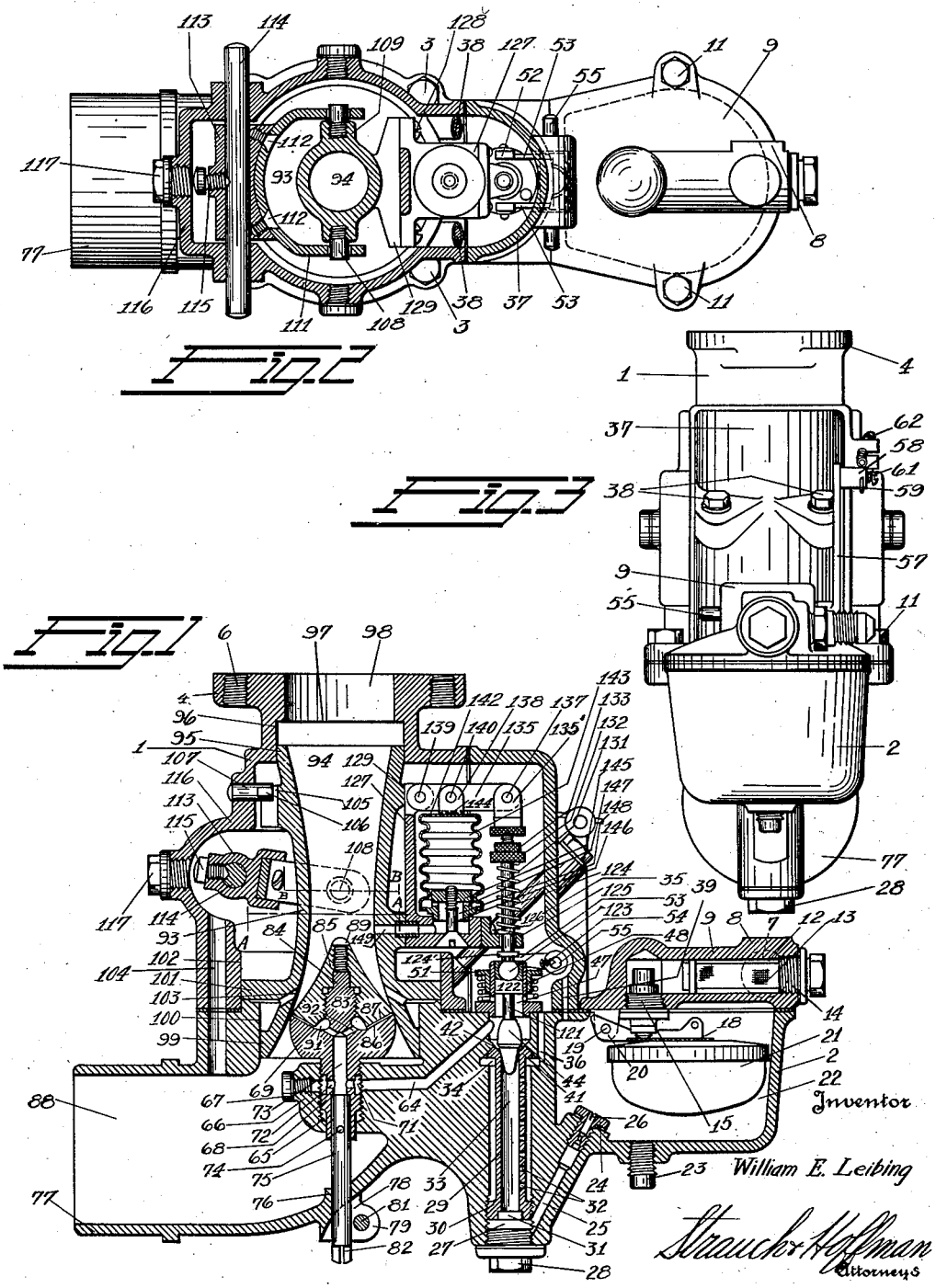

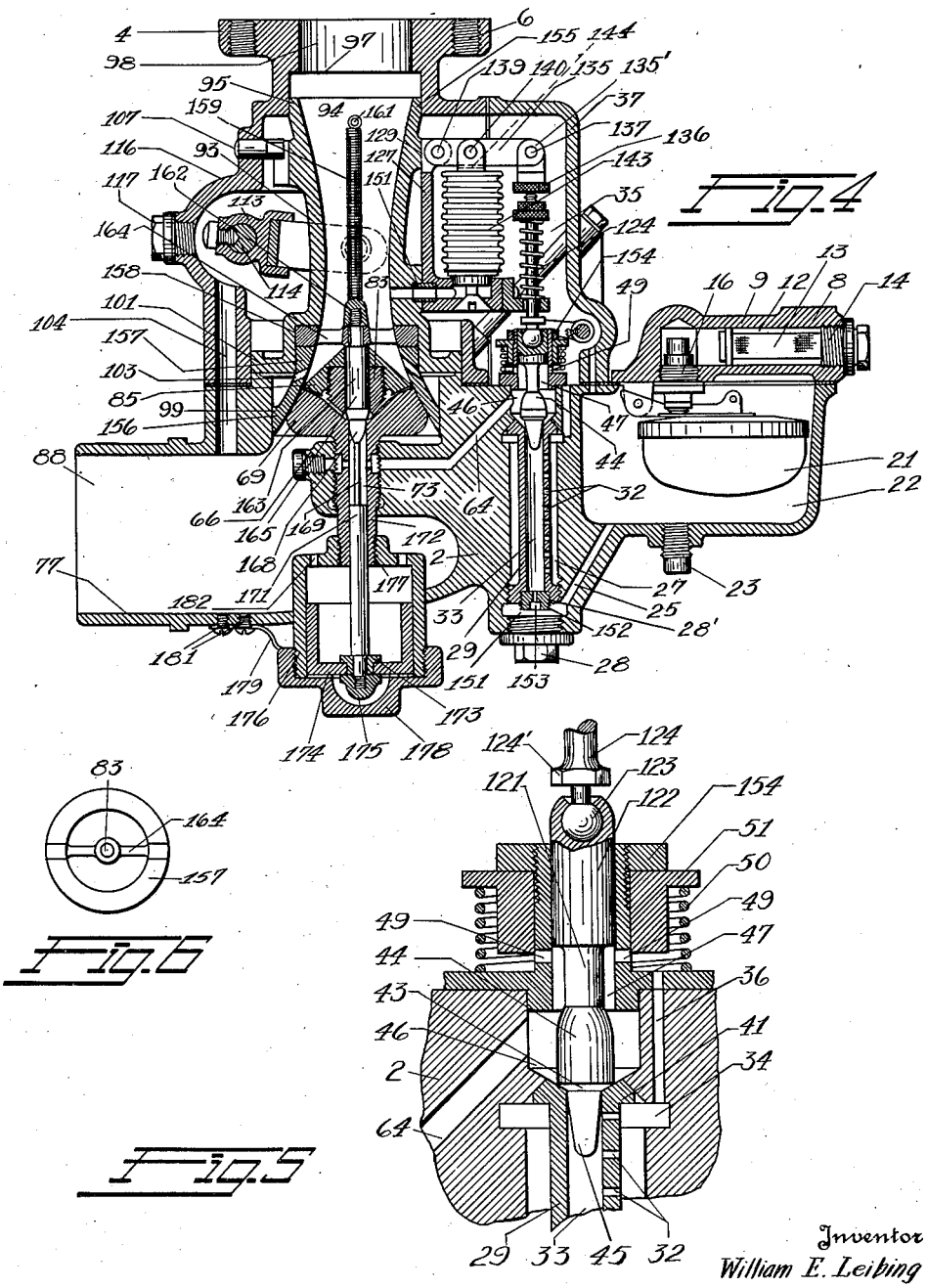

1,990,702

UNITED STATES PATENT OFFICE 1,990,702

METHOD AND APPARATUS FOR PRODUCING FUEL MIXTURES

William E. Leibing, Sausalito, Calif., assignor to Leibing Automotive Devices, Inc., San Francisco, Calif., a corporation of Nevada Application June 10, 1931, Serial No. 543,427

7 Claims. (Cl. 261—69)

My present invention relates to novel methods and apparatus for producing fuel mixtures.

More particularly my invention relates to the provision of novel methods and apparatus to provide effective carburetion and highly efficient fuel mixtures adapted for complete combustion of hydrocarbon fuels in internal combustion engines, torches, burners and the like, and by the use of which considerably heavier grade of fuel may be utilized in the operation of the usual types of volatile fuel consuming automotive and similar internal combustion variable speed power units in which speed control is effected by throttle control of the fuel supply.

As is well known, automotive types of internal combustion engines in common use are at present restricted to the use of the more volatile fuels. This I have found is entirely due to the inability of carbureting devices and systems now in common use to produce suitable fuel mixtures of the heavier fuels.

As the grades of motor fuels through the past several years have become less and less volatile and the fuels have become more complex, the heat applied to the intake manifold of automobile engines has been increased to offset the lower fuel volatility causing increasing vaporization of the fuel in the manifold. The increasing addition of heat to the in-going engine charge expands the charge, and raises its temperature. This results in decreasing the effective charge per cylinder, in lowered power per working stroke, lowered volumetric engine efficiency, and in a higher temperature cycle of operation, with increased engine operating temperatures.

Motors equipped with prior carburetion systems utilizing heat are hard to start and require in starting a so-called "choking" operation consisting of flooding the cold motor with fuel. The undesirable choking must be continued until engine temperatures come up to a point where the fuel will be vaporized in the carburetion system. The existing carburetor's sole function is to measure and pour into the in-going air stream, an amount of fuel at all times equal to the engine requirements, but the function of mixing this fuel with the air in a manner to form an explosive mixture, is accomplished primarily in the intake manifold.

Fuel mixtures formed by the prior methods have many operating disadvantages. Motors operating on such mixtures cannot operate economically at high speeds because at high speeds the carburetor heating system cannot raise the temperature of the great amount of air passing through the intake manifold to a point equal to the boiling point of the fuel. This results in a wet mixture in the manifold, which cannot be evenly distributed to the various cylinders of a modern multi-cylinder engine, since sudden reversals of flow in the intake manifold, caused by successive cylinders drawing their charges cause the drops of fuel always present in a wet mixture, to be thrown out of the air stream, much as if a whip lash were thoroughly wetted and then snapped. The result is that the fuel mixture to various cylinders is of different proportions of fuel and air. Since the carburetion system must be adjusted to accommodate the cylinders receiving the leanest charge, the rest of the cylinders run with a richer mixture than is necessary. The variable fuel mixtures delivered to the different cylinders results in roughness and lack of smooth operation of engines.

In addition to the gassing and smoking caused in existing types of engines when the engine intake vacuum substantially exceeds the idling vacuum for the reasons fully disclosed in copending application S. N. 483,883 filed September 23, 1930, I have found that an intake manifold, with a carbon deposit of from an eighth to a half inch in thickness and operating wet with fuel, absorbs a considerable amount of fuel, and when the throttle is closed at high engine speeds, as a result of the high vacuum, the heavy fuel ends distill off from the carbon deposit, causing the engine to emit a dense cloud of smoke, gas, and unburned fuel.

I have furthermore discovered as a result of extended experimentation and analyses that a further inherent fault of common prior systems of carburetion lies in the necessity of introduction of resistance to fuel flow, which results in an undesirable separation of modern complex fuels into component parts. Many prior designs of carburetors have used balanced pressures between float chamber and spray tip in an effort to resist the excessive tendency of fuel flow as a result of the effect of engine vacuum on the carbureting device. In other prior designs where pull on fuel tip is heavy, small apertures and metering orifices are used to prevent excessive flow of fuel from the tip in operation.

From extended practical investigations, I have found that the feeding of complex modern fuels through small apertures from a high pressure area to a low pressure area and the balanced pressure systems in common use in modern carburetion, causes the separation of the fuel into its different component parts somewhat in the nature of distillation. Moreover, the effect of the high manifold heat used is to cause the lighter constituents of the fuel to vaporize more rapidly and the heavier constituents to be left behind temporarily. However, since a considerable mixture flow occurs through the manifold of an engine, as the heavier portions accumulate they are eventually picked up by the flow as a body, and are carried along with the fuel mixture from time to time, upsetting the mixture ratio and causing further rough motor operation.

The resultant irregular, poorly carbureted, and variable fuel mixture produced by existing carburetion methods gives inferior motor operation in which combustion is not complete in the motor cylinders, and in which a certain percentage of the combustion occurs in the exhaust system.

I have discovered that it is possible to avoid the defects of prior carburetion systems, to eliminate the necessity for the use of manifold or vaporizing heat, and to provide novel and improved uniform dry fuel mixtures properly proportioned for combustion with modern complex fuels, which give highly efficient, smooth, and considerably improved operation of combustion engines, by the use of novel methods and principles of carburetion involving the steps of metering the complex fuels in a manner to prevent separation into constituent elements, feeding the fuel into a high velocity air stream in proper manner, and maintaining the flow of the fuel and air mixture at a sufficient velocity and for a sufficient time to complete atomization of the fuel, and the reduction of the fuel mixture to the form of a dry and permanent gaseous condition for all practical purposes.

In the preferred embodiments of my invention fuel in properly measured quantity is fed in a thin sheet at substantially right angles to a high velocity air stream in such manner that a large number of microscopic particles or ribbons of fuel are apparently continuously drawn off into the air stream. I have discovered that if the velocity of the stream is maintained for a sufficient period after these particles or ribbons of fuel are drawn off, the fuel will separate into microscopic divisions, apparently of colloidal nature, completely surrounded and separated by air, and thereafter these microscopic divisions of fuel will remain in suspension in the mixture for long periods of time. If, however, before the necessary fine division and complete separation of fuel particles is complete, the velocity of the stream falls off sufficiently, the cohesion of the unseparated fuel particles apparently overcomes the tendency of the air stream to tear the particles or ribbons apart, and sufficiently large globules are formed so that they will not remain in suspension in the air. A wet mixture then results, requiring the application of heat in the manner of the prior art, for operation of an internal combustion engine on the wet mixture so formed.

By giving sufficient unrestricted length to the high velocity flow of the fuel mixture, and designing a carburetor so as to give at all throttle positions a sufficiently high velocity to the impinging streams of fuel and air, a device is provided capable of delivering to the manifold of an engine, a dry gaseous uniform novel mixture of fuel and air in a state of gaseous permanence and homogeneity not heretofore secured by any of the known carbureting systems or devices. This mixture is apparently a colloidal suspension of fuel in air, and comprises dry gaseous uniform mixture in which in quiescent state, the fuel will remain suspended for long periods of time, and from which no fuel is thrown out under the most severe conditions of reversal in the complex manifolds of modern multicylinder engines. Engines with good compression, properly equipped with my improved carbureting system, permitted to stand over night after being stopped by shutting off the ignition, may be started without the necessity of the usual cranking, by passing an igniting spark through the cylinder charges that remain in the engine.

My improved fuel mixture gives a maximum effort to the crank of an engine of considerably greater value than the prior fuel mixtures in a manner free from excessive peak pressures or detonation, and the mixture is burned completely in the cylinder rather than partially in the exhaust system. This is apparently due to differences of flame propagation in my novel mixture and in the prior mixtures. This is apparently due to the fact, that in engines using the existing and prior carburetion systems, a compound charge of fuel mixture is delivered to the engine which is veined in all directions by fuel constituents of different volatility and combustibility. Consequently upon ignition, the highly volatile veins immediately transmit throughout the entire mass a runner of flame tending to instantly ignite the entire mass and causing an increase in pressure and temperature in the nature of detonation. This rise in temperature and pressure is however extremely short lived and of little power value as the energy is absorbed by the heavier fuel constituents which are thereby ignited and apply the power to the pistons. The ignition of the heavy fuel is spontaneous and irregular and as a result, a substantial portion of the molecular energy thus suddenly released, in accordance with well known theories, is lost in ineffective molecular internal collisions.

With my improved system of carburetion, the distribution of all component parts of the fuel, is not only microscopic as to its subdivision, but is also uniform and homogeneous throughout, and upon ignition, my improved mixture apparently presents a solid front to the advance of the flame. Since no highly volatile veins are present to propagate the flame immediately throughout the mass, and the heavy elements must burn with the lighter, the result is a slow burning combustion cycle in which no peak, detonating or wave pressure occurs, but in which an orderly wall of flame has advanced through the charge always at a lesser pressure than the peak pressures of the prior fuel mixtures, but over a much longer period of time, with the result that lowered stresses are imposed on the bearings and engine parts and a materially greater average torque is delivered per combustion cycle with an equivalent amount of fuel.

With properly designed and proportioned carburetors embodying my invention no difficulty whatever is experienced in igniting the heavier fuels, such as distillate, kerosene, furnace oils, etc. and the like by conventional spark methods. Carbureted in accordance with my present invention with conventional engines, automobiles have been driven many thousand miles with the heavier fuels mentioned, with results fully as good as with conventional gasoline. The heavier fuels deposit less carbon and develop approximately equal power, and approximately equal fuel economy with gasoline when carbureted in accordance with my present invention.

With my improved carburetion methods and apparatus, starting of internal combustion engines is greatly facilitated, as no heat is required to assist in vaporizing the fuel, and the engine is therefore ready to start immediately and to run properly regardless of engine temperature. "Choking" or flooding the engine with fuel is eliminated.

With my improved carbureting apparatus the fuel mixture is delivered to the engine at considerably less than atmospheric temperatures, owing to a refrigerating or cooling effect that develops as the carburetor operates in practice. This cooling effect is apparently due to the pressure drop of the air in passing through the carburetor, and the heat absorption incident to the atomization or colloidal division of the fuel particles in the carburetor. The development of such cold fuel air mixtures, result in a decided power increase in an engine supplied with fuel mixture by my improved carburetion system, as considerably more fuel charge is taken into the cylinders when the mixture is cold than when it is hot and partially expanded. Furthermore, engines equipped with my new improved carburetion system operate at substantially lower temperatures and with increased power and efficiency, even when burning low grade fuels, than when equipped with hot air or hot spot carburetors in common use.

In the preferred embodiments of my invention, and particularly when operating on heavier fuels, an economizing device is preferably utilized to eliminate smoking, gassing, and to save fuel during deceleration. The fuel economizing and smoke and gas eliminating device hereinafter disclosed as built into my improved carbureting apparatus, is an improvement over the economizing device disclosed in my copending application Serial Number 483,883, shown in combination with a usual type of carburetor. The essential improvement in the economizing device herein disclosed and which is applicable to the type of economizer shown in said copending application when applied to the usual types of carburetors, comprises a positive control of the economizing device with the throttle control. This improvement in such economizing devices is due to the fact that when a motor vehicle is on a slight down grade and it is desired to barely open the throttle, it is possible to exceed idling vacuum, even with a partially opened throttle, due to the load driving the engine. In such a case I have found it desirable that the action of opening the throttle also forcibly opens the economizer fuel control valve, as otherwise a condition can be created where the economizer fuel valve will be partially held to its seat on a partially opened throttle causing back firing due to a too lean mixture being supplied to the engine under such conditions.

Present carbureting systems are admittedly of a design, wherein maximum economy cannot be effected and maximum acceleration retained. For example, present carbureting systems are such that cars driven at 20 miles per hour, must be capable of rapid acceleration to 25 miles per hour, and must be supplied at 20 miles per hour, with a mixture that will drive the car at a speed of 25 miles per hour. In other words present standard carbureting methods supply engines, under all practical conditions of operation, with sufficient fuel, which under proper conditions would operate the vehicle either more economically or faster.

In the preferred embodiment of my present invention, means are provided whereby the leanest possible fuel mixture may be used in all running positions, and when rapid acceleration to a higher speed is required, the sudden movement of the accelerator first makes a proper change in the amount of fuel delivered for acceleration and then allows the throttle to move. By this method of operation, a motor vehicle may run, for example, at 20 miles per hour with the leanest possible mixture, and when the accelerator is rapidly moved to a position corresponding with, for example, 25 miles per hour, the only change immediately made in the carburetor is to make the fuel air mixture richer or to give the engine the fuel required to drive the car 25 miles per hour. This richer mixture is continued until the engine has speeded up to correspond to the new accelerator position, when the engine will resume running in the new position on the leanest possible fuel air ratio for such position.

Accordingly, a primary object of the present invention is to provide novel dry gas fuel mixtures for use in internal combustion engines, burners, torches and the like, by the use of which uniform, homogeneous and effective combustion is secured.

A further object of the present invention is to provide novel methods and means operable under changing throttle conditions in a carburetor, to change the fuel mixture ratios in advance of the throttle change, to provide a fairly rich fuel mixture to be delivered to the engine under accelerating conditions, and permitting the most economical fuel mixture to be utilized at all running positions.

A still further object of my invention is to provide novel methods and apparatus for utilizing heavier fuels than gasoline in conventional spark ignited internal combustion engines.

Another object of the invention is to provide novel methods and apparatus whereby each cylinder of a multi-cylinder engine will be supplied with a mixture of the same fuel-air ratio, thereby eliminating the common manifold distribution difficulties of multi-cylinder internal combustion engines.

A further object of the invention is to provide novel carburetion methods and apparatus that refrigerate or cool the fuel mixture, thereby permitting the operation of internal combustion engines at temperatures substantially below the operating temperatures of engines when equipped with the usual carburetion systems employing fuel vaporizing heat.

A still further object of the invention is to provide novel methods and apparatus for carburetion of a type whereby present engine compression ratios may be substantially raised, without detonation, pre-ignition, excessive bearing loads, spark knocks, and without any harmful effects on present standard types of spark plugs.

A still further object of the invention is to provide a novel fuel economizing and gas and smoke eliminating device, the principles of which are especially adapted for use in connection with the improved forms of carburetors herein disclosed, but the principles of which are also applicable to the various types of carburetors and carburetion in common use.

Further objects of the invention will appear from the foregoing general discussion of the advantages of my present invention, and the following detailed description thereof, and are such as may be attained by a utilization of the various novel principles, steps, combinations and subcombinations herein disclosed and defined by the scope of the appended claims in the various relations to which they are adapted.

Referring to the drawings:

Fig. 1 is a vertical sectional view of one embodiment of my improved carbureting and fuel atomizing device.

Fig. 2 is a plan view, partially in section, of the form of invention shown in Fig. 1.

Fig. 3 is an end view of the form of invention shown in Fig. 1, looking from the bowl end.

Fig. 4 is a vertical sectional view showing preferred form of carbureting device embodying my invention.

Fig. 5 is an enlarged fragmental sectional view illustrating the outside metering pin arrangement and idling adjustment utilized in the embodiment of the invention shown in Fig. 4.

Fig. 6 is a fragmental plan view showing the method of attaching the inside metering pin in the form of invention shown in Fig. 4.

As shown in Figs. 1 and 3, my improved carburetor comprises a top casting or housing 1 secured to a bottom or bowl casting 2 by means of securing screws 3 (Fig. 2) forming a separable housing for my improved atomizing and carbureting device. Top casting 1 is provided with a securing flange 4 by means of which the device is connected to the intake manifold of an internal combustion engine through the use of screws that thread into suitable tapped holes 6 formed in securing flange 4 (Fig. 1).

Fuel is supplied to the device through union connection 7 threaded into boss 8 of float chamber cover 9 in turn suitably secured to bowl casting 2 by cap screws 11. The fuel from connection 7 passes into bore 12 of cover plate 9, and through the filter screen assembly 13, threaded at 14 into the tapped end of bore or chamber 12. Fuel passing through the filter or screen assembly 13 passes endwise out of the filter assembly into the left end of bore 12 to a float operated valve assembly 15 of any well known construction threaded at 16 into cover plate 9.

Valve assembly 15 comprises a float-operated valve member provided with an operating stem 17 actuated vertically by float bracket 18. Float bracket 18 is pivoted at one end by means of pin 19 to downwardly projecting ears 20 formed integrally with cover 9. Secured to bracket 18 is a float member 21 disposed in chamber 22. Float 21 and valve assembly 15 function in well known manner to maintain a predetermined fuel level in float chamber 22. A drain plug 23 is provided in the bottom wall of float chamber 22, for the purpose of draining the fuel from the chamber.

Fuel from float chamber 22 passes through metering bushing 24 screwed into the tapped enlarged end of fuel passage 25. Bushing 24 is provided with a comparatively large metering passage 26, the necessity for a small orifice being eliminated due to the fact that fuel is fed from flow chamber 22 through passage 26 solely under the influence of gravity.

The lower end of passage 25 communicates with the lower end of a bore 27 formed in casting 2, which is tapped and closed by screw plug 28. Screwed into the bottom of well chamber 27 is member 30 provided with a well tubular extension 29. A squared socket 31 is formed in member 30 to receive a wrench or tool when plug 28 is removed.

Formed in the tubular well member 29 is a vertical series of lateral passages 32, which establish communication between the well chamber 33 of tubular member 29 and bore 27. Communicating with the upper end of chamber 27 is annular air channel or chamber 34 which communicates with chamber 35 through passageway 36 formed in casting 2. Chamber 35 is formed partially in housing 1 and by a cover plate 37 secured in position against castings 1 and 2 by means of studs 38. Chamber 35 houses control mechanism and communicates with the outside atmosphere hereinafter to be described in detail and protects the mechanism from injury.

Communication between the top of float chamber 22 and chamber 35 is established by means of air passage 39, so that a balanced atmospheric pressure is maintained on the top of float chamber 22 and over the fuel in chamber 34, thereby insuring that fuel flows from the float chamber to the fuel well solely under the influence of gravity, and eliminating the necessity for a small metering orifice at 26, thereby eliminating the tendency present in existing carburetors, of separating complex modern fuels into their constituents, due to forcing the fuel through small metering orifices under large pressure differences.

Formed integrally with the upper end of tubular member 29 is a head 41 which nests against a suitably formed conical recess in bowl casting 2, and is provided with a conical valve seat 42 against which conical surface 43 of valve member 44 is adapted to seat in operation, as will more fully hereinafter appear. Formed integrally with valve member 44 is a metering pin 45 shaped to vary the opening for the passage of fuel and air mixture out of the top of well 33 in accordance with the varying fuel mixture requirements of the engine for which the device is designed. Valve member 44 is disposed in an annular bore chamber 46 formed above chamber 33 in bowl casting 2, and chamber 46 communicates with a chamber 47, formed in the metering pin and valve guide member 48, which is pressed, or otherwise suitably secured into the upper end of the bore 46.

Valve member 44 is arranged to simultaneously and inversely vary the extent of the opening between chamber 46 and well 33, and chamber 46 and chamber 47. In its uppermost position valve member 44 gives a maximum amount of opening between chambers 46 and 33, and in its lowermost position it closes the upper end of chamber 33, and gives the maximum opening between the chambers 46 and 47. In the intermediate positions of valve 44, openings of various sizes are established between these chambers, the shapes of metering pin 45 and valve 44 being such as to feed a proper proportion of fuel and air for the different running positions to the main fuel nozzle of the device, as will more fully hereinafter appear.

Communication to atmosphere within chamber 35 is established from chamber 47 through lateral openings 49. To cut off the flow of air from chamber 35 through openings 49 to chamber 47, a sleeve member 51 is slidably mounted on the tubular extension of member 48, which is urged upward by a coil spring 50 against the inner ends 52 of a control lever 53. The opposite ends of control lever 53 are secured by means of set screws 54 to operating spindle 55 rotatably mounted in suitable bearings formed in extension 56 of cover member 37. Rigidly secured to one end of spindle 55 is the lower end of starting lever 57, the upper end of which is provided with a boss 58, through which the end of a Bowden wire 59 extends. Wire 59 is secured in position in boss 58 by means of a set screw 61 and extends through a flexible guide tube 62 to the dash of the vehicle or other suitable control position.

When it is desired to decrease the proportion of air and to increase the proportion of fuel fed to the main fuel nozzle control wire 59 is actuated to rock lever 57, spindle 55 and levers 53 counterclockwise in Figure 1, forcing sleeve 51 downward against the compression of spring 50, to close air openings 49 to chamber 47 thus cutting off the air supply to chamber 47. This will result in a greater proportion of fuel being drawn from chamber 33 so long as the openings 49 are closed. After starting has been accomplished, control levers 57 are restored clockwise to the position shown in Figure 1 by actuation of the control wire 59, and sleeve 51 rises under the influence of spring 50 until passages 49 are again opened permitting air to be drawn therethrough into chambers 47 and 46 and mixed with fuel from chamber 33.

Formed in bowl casting 2 is a fuel mixture passage 64 one end of which communicates with chamber 46 and the other end of which terminates in bore 65 formed in nozzle supporting extension 66 of bowl casting 2. For convenience of manufacture, passage 64 is formed by drilled holes, of which the end terminating in extension 66 is threaded to receive closing screw plug 67.

Threaded into and adjustably supported in tapped lower end of bore 65 is shank 68 of fuel nozzle member 69. An annular fuel mixture channel 71 formed in shank 68 communicates with and receives fuel mixture from passage 64 and holes 72 establish communication between chamber 71 and central bore or passage 73 formed in nozzle member 69.

Nested in an enlarged section of bore 73 and secured to shank 68 by means of pin 74 is a nozzle assembly adjusting rod 75 which is journalled in and extends through boss 76 of air intake section 77 of bowl casting 2. The outwardly projecting section of boss 76 is split as indicated at 78 in Figure 1, to form a pair of protecting ears 79 adjacent the split section, through which clamping screw 81 extends. A squared end 82 to receive a nozzle adjusting wrench is provided on shaft 75.

By loosening screw 81 and rotating shaft 75, the entire nozzle assembly may be adjusted with relation to the throttle control member, and by tightening screw 81 ears 79 may be drawn together to tightly grip and hold shaft 75 together with the nozzle assembly in properly adjusted relationship.

Nozzle member 69 has formed integrally therewith a threaded extension 83 provided with a nozzle tip member pilot extension 84 upon which the nozzle tip member 85 is screwed. Nozzle members 69 and 85 are provided respectively with conical surfaces 86 and 87 spaced apart to form fuel mixture outlet channels from the nozzles, through which a conical sheet of fuel mixture or air-fuel emulsion is fed into the air stream drawn through air intake passage 88 of air intake extension 77 in a manner that will more fully hereinafter appear. The separation of surfaces 86 and 87 may be varied by adjusting tip member 85 on threaded supporting shank 83, and a locking screw 89 threaded into the end of tip member 85 and abutting against pilot extension 84 provides means for locking the tip member 85 in adjusted position.

The spacing or separation of surfaces 86 and 87 and the length of the fuel ejecting passage or channel formed thereby form important features of the present invention. The spacing and arrangements should be such that a rolling turbulence or intimate mixing effect occurs on the fuel as it passes between surfaces 86 and 87, and a directional effect is imparted to the fuel mixture flowing from the nozzle in operation, so that a conical sheet of fuel mixture in the form of an intimate mixture or emulsion of air and fuel is fed substantially at right angles into the air stream from passage 88. A passage length of approximately three-eighths of an inch, and a thickness of 0.003 to 0.009 of an inch have given excellent results in practice in a carburetor utilized on a La Salle car, the preferred spacing being approximately 0.003 of an inch.

The fuel passages formed between surfaces 86 and 87 terminate in an annular distribution chamber 91 connected by passages 92 formed in the base of threaded extension 83, to the upper end of passage 73.

The air passing by the nozzle is drawn through the usual air cleaner into passage 88 and the flow is controlled by control tube 93 having a control passage 94. Control tube 93 has formed at its upper end a cylindrical surface 95 which fits slidably into bore 96 of upper housing casting 1. In uppermost or wide open throttle position of control tube 93, the upper edge thereof abuts against stop surface 97 of housing casting 1, and the fuel mixture passing through passage 94 enters the engine manifold through passageway 98.

Formed at the lower end of the control tube 93 is cylindrical piston section 99 which fits slidably into bore 100 of bowl casting 2. Formed integrally with control tube 93 above piston 99 is a cylindrical or trunk piston extension 101 which fits slidably in bore 102 of the housing section 1. Communication between the engine side of the nozzle assembly in passage 94, and the space between trunk piston 101 and piston 99 is established by means of passages 103, to establish engine manifold pressures on the lower side of piston 101 in operation. Atmospheric pressure in chamber 35 is established through communicating passageway 104 from air intake passage 88 so that in operation the tendency of control tube 93 is to move upward due to the influence of sub-atmospheric pressure differences on the engine side of nozzle assembly 69 and is counterbalanced by the excess of pressure on the upper side of piston 101 over the pressures developed in the space between the pistons 101 and 99.

Control tube 93 is provided with a slotted guide 105, slidably engaging guiding surfaces 106 of guide pin 107 rigidly secured in housing casting 1. The position of control tube 93 with relation to nozzle assembly 69 in operation of the device is controlled by means of hardened actuating pins 108 screwed into bosses 109 (Figure 2) of tube 93. Pins 108 extend through and are slidable in suitably slotted holes formed in yoke 111, which is secured by means of counter sunk head screws 112 to a fulcrum block 113, which in turn is secured to an operating spindle 114 by means of set screw 115. Convenient access to set screw 115 is provided through a threaded opening in section 116 of housing 1, normally closed by screw plug 117. Any suitable actuating mechanism may be provided for rotating spindle 114, as for example, the usual controls of a motor vehicle, and actuation of spindle 114 results in vertical displacement of the tube 93 with respect to the nozzle assembly in a manner that is apparent to those skilled in the art.

Proper proportions, shape and arrangement of passage 94 with respect to the fuel nozzle are essential for the production of my novel dry gas fuel mixture throughout the range of operation of the device. Passage 94 should be so shaped and proportioned with respect to the fuel nozzle that in all conditions of operation a sufficiently high velocity of flow of air through passage 94 will be maintained for a sufficient length of time to cause sufficiently fine division of fuel particles fed into the air stream from the nozzle so that they will remain in suspension for substantial periods even when the velocity of flow is arrested or suddenly reversed in an engine manifold. If the requisite velocity is not maintained for a sufficient distance, a wet fuel mixture results from which the the fuel will settle or be thrown out in the intake manifold, more or less of the type of mixture produced by prior carburetion systems, so that heat must be applied thereto to secure a proper combustion of mixture in the engine.

The relationship of velocity and distance of flow necessary to produce my novel dry gas fuel mixture suitable for cold air carburetion varies with the size of the carburetor utilized, the nature of fuel and degree of volatility of the nozzle design and other engineering factors. A carburetor designed to produce my improved dry gas mixture with a heavier fuel, will function properly with the lighter fuels, so that by designing the carburetors properly, a wide variety may be utilized in a given motor vehicle.

Furthermore, since the velocity of air flow through passage 94 is decreased as the throttle opening is increased, and is at minimum at the widest throttle opening, by designing the control tube so that sufficient velocity and length of flow exists with the throttle or control tube 93 in wide open position to produce my improved dry gaseous fuel mixture, the necessary fine division or atomization of fuel will be secured throughout the entire range of operation of the carburetor from wide open to idling condition. It is to be here noted that the arrangement whereby an intimate mixture or emulsion of air and fuel is fed from the nozzle into the air stream in control passage 94 is an important aid in securing atomization or apparently colloidal division of fuel particles, particularly of the heavier fuels utilized, apparently due to the sudden expansion of the intimately mixed air as the mixture leaves the nozzle.

The shape and proportions of control passage 94 and the nozzle shown in Figure 1 was developed in practice for use with La Salle pleasure cars, and gives entirely satisfactory operation with fuels ranging from furnace oil to high test gasoline. In this specific embodiment of my invention the circumferential length of fuel outlet passage is approximately 4.7 inches, and with the control tube in its position of maximum opening, the distance of the inner surface of passage 94 from the edge of the fuel outlet is approximately ⅛ of an inch. The minimum cross-sectional area of passage 94 in this embodiment of the invention is located at the line A—A with the control tube in closed or idling position, a distance of approximately $1\tfrac{13}{16}$ of an inch from the fuel nozzle outlet, and with the throttle in wide open position, is located at line B—B approximately $2\tfrac{3}{16}$ inches from the fuel nozzle. The diameter of the control tube at the section of minimum area is approximately $1\tfrac{5}{8}$ of an inch, and the minimum area of control passage 94 is less than the area of the annular space around the fuel nozzle outlet when the control throttle is in its wide open position, so that in wide open throttle position an increasing velocity of flow occurs from the nozzle outlet to the line B—B after which the velocity of flow gradually decreases. From the section of minimum area at A—A to the end of passage is $2\tfrac{5}{16}$ inches, the diameter at the upper end of the passage is approximately 1⅝ inches, and the diameter at the lower end of the passage is approximately $2\tfrac{5}{16}$ of an inch, and the total length of the tube is $4\tfrac{13}{16}$ inches. The wall of passage 94 is streamlined or curves gradually. The remaining proportions of the carburetor are shown on a corresponding scale in Figure 1.

With the proportions given cold air carburetion on a wide variety of fuels from furnace oils to the highest grades of gasoline and motor fuels has been secured in a La Salle car, providing a mixture of such dryness that when the ignition to one of the cylinders is interrupted and the engine operated the cylinder walls of the non-operating cylinder remain dry while using my improved carburetor, while in the same engine when operated with a carburetor of the usual type in the same way, after a short period of operation the walls of the non-operating cylinder are wet with fuel. Similar demonstrations may be made with other types of cars.

While detailed measurements for a carburetor suitable to operate an internal combustion engine of the type utilized in a La Salle car have been given, it is to be understood that the figures and proportions given are by way of specific example only, and wide variations may be made by those skilled in the art from the detailed proportions given, and various different proportions will be found desirable for engines of different sizes and makes.

In operation of my improved carbureting device the position of control valve 44 is movable with control tube 93 through suitable mechanical connections, which may be rigid connections to the control tube, so that the position of valve 44 in chamber 46 will be determined by the position of control tube 93 for the purpose of varying the relative proportions of fuel and air fed into passage 64 and the fuel nozzle for various throttle positions, thereby varying the richness of the fuel mixture to meet the varying engine requirements at different throttle openings and under varying load conditions. Since the maximum velocity of air flow in passage 94 occurs while control tube 93 is in its position of minimum opening or idling position, and the minimum velocity of flow occurs past the fuel outlet with the control tube in wide open throttle position, the maximum suction effect on the nozzle occurs in idling position. However, with control tube 93 in idling position it will be seen that valve 44 is in its lowermost position, establishing a minimum area for fuel passage out of chamber 33 into chamber 46 and a maximum air opening between chambers 46 and 47, so that a major proportion of air, and a minimum proportion of fuel is delivered to the nozzle in idling position. On the other hand, with the throttle in wide open position valve 44 is in its uppermost position permitting a minimum flow of air into chamber 46 from chamber 47 and a maximum opening for the passage of fuel and air from well 33 into chamber 46, increasing the richness of the fuel and air mixture fed to the nozzle.

While valve member 44 as above stated may be connected by rigid mechanical connections to move with the control tube 93 in a manner that will be obvious to those skilled in the art, in the embodiment of the invention shown in Figures 1 to 3 I have incorporated a fuel economizer and gas eliminating mechanism, operative when tube 93 is in idling position and the engine intake pressures in the control tube 93 on the engine side of nozzle assembly 69 drop below normal idling pressure, to close valve 44 completely, thus imparting a multiple function to valve member 44, and materially increasing the efficiency of the engine supplied with fuel by my improved carbureting devices. The theories of operation involved in the fuel economizer and fume eliminator are disclosed in detail in my above mentioned copending application and will not be repeated here. The operation of fuel cut-off valve 44 for economizing purposes by the throttle movement as well as under influence of the intake pressures of the engine, is however an improvement herein disclosed applicable to the fuel economizer and gas eliminator disclosed in said copending application.

In the form of invention shown in Figure 1, valve stem 44 has formed integrally therewith a stem 121 connected to a guide cylinder 122 slidably mounted in bore 47 of guide member 48. Piston 122 is provided with a ball and socket connection 123 to the end of operating stem 124. Stem 124 is provided with an adjusting collar 124' and extends upwardly through a hole in bracket 125 which is secured by screws 126 to a sylphon supporting bracket 127, which in turn is secured by means of screw 128 to the vertical faces of projections or extensions 129 of control tube 93. Surrounding stem 124 is a helical compression spring 131, the lower end of which abuts against bracket 125, and the upper end of which abuts against a compression adjusting nut or collar 132 on the threaded end of pin 124 and locked in adjusted position by means of locking collar 133. Threaded on the upper end of stem 124 is yoke 135' locked adjustably in position by locking collar or nut 136.

Yoke 135' is pivotally connected by means of pin 137 to one end of walking beam 135, the opposite end of which is pivoted by means of pin 139 to suitable projecting ears formed on bracket 127. Secured to beam 135 intermediate its ends by means of pin 140 is a yoke 138 which in turn is secured rigidly to the upper wall 142 of the resilient metallic bellows member 143. In extended position, yoke 138 engages stop projections 144 (Figure 1) of bracket 127 thereby limiting the expansion of bellows 143 in operation. Bellows 143 at its lower end is secured to a supporting base member 145, which in turn is secured to bracket 127 by means of the countersunk head screw 146. Communication between the interior of bellows 143 and the engine side of the nozzle in passage 94 is established through passages 147 and bore 148 in bellows supporting member 145, and through passage 149 formed in the wall of tube 93, through sealing bushing 151 and through bracket 127.

In operation the nozzle assembly is adjusted with relation to control tube 93 in the manner above set forth to establish a proper opening for idling purposes. Stem 124 is then adjusted in yoke 135, and with control tube 93 in idling position, and bellows 143 expanded by internal pressures as shown in Figure 1 until yoke 141 is against stops 144, so that face 43 of valve 44 will be sufficiently spaced from seat 42 of well member 41 as shown in Figure 1 to supply sufficient fuel mixture from well 33 to permit the engine to idle properly. The compression of spring 131 is then adjusted so that with the engine idling properly the tendency of bellows 143 to contract will just be overcome by the compression of spring 131 and face 43 of valve 44 will be maintained a proper distance from surface 42 as shown in Figure 1, to permit a proper idling fuel mixture to pass from well 33 to the nozzle, a spacing of approximately .005 of an inch between faces 42 and 43 being sufficient for idling purposes in the La Salle carburetor above referred to.

When the engine is idling or is doing useful work, the intake pressures will be equal to or above normal idling pressures, and under such conditions the parts will remain in the position shown in Figure 1. When, however, the load drives the engine with control tube 93 in idling position, as for example during deceleration of the engine, the pressure in tube 94 drops below the normal idling intake manifold pressure, and the proportion and adjustment of parts is such that tendency of bellows 143 to contract will overcome the compression of spring 131 sufficiently to firmly seat valve face 43 on the valve seat 42, cutting off the fuel supply completely from the nozzle, and permitting air only to be drawn from chambers 47 and 46 to the nozzle. When the pressure in tube 94 reaches normal idling pressure bellows again expands, and with the control tube in idling position valve 44 will be raised sufficiently to permit a proper supply of idling fuel mixture to flow to the nozzle. With the fuel economizing and fuel eliminating assembly mounted on bracket 127 which is movable with control tube 93 the parts are preferably so adjusted that when the control tube 93 is moved slightly from throttle position, even with manifold pressures below normal idling pressures, valve face 43 will be moved sufficiently from seat 42 to supply a sufficiently rich fuel mixture to permit operation of the engine without backfiring resulting from too lean a mixture. Such backfiring sometimes occurs with the fuel economizing and fume eliminating device of my copending application when a vacuum slightly below the idling vacuum is created with the throttle slightly open, due to operating a motor vehicle on a slight grade with the throttle opened a trifle.

The arrangement of walking beam 138 and the connected parts is such that the motion of bellows 143 is multiplied substantially on valve 44, providing a sensitive and effective means of cutting off the fuel supply to the engine during deceleration under closed throttle conditions.

In addition to the variation of the proportions of air and fuel secured by operation of valve 44 with the position of the throttle and movement of the control tube 93, the relative proportions of air and fuel are varied automatically in accordance with speed variations of the engine in given throttle positions by the arrangement shown.

With the engine turning over at high speed in any given throttle position a balance of fuel level in well 33 will be established which will result in a predetermined amount of air being drawn through openings 32 in the well tube 29 into chamber 33 above the level of the fuel and mixed with the fuel passing upward into chamber 46.

If the engine slows down with the throttle in the same position, due for example to an increase in grade or other road conditions met by the vehicle, the suction effect of the engine on the carburetor will be reduced, and the fuel level in well 33 will rise reducing the number of holes 32 through which the air may pass into chamber 33. A larger proportion of fuel and less air will accordingly be drawn from well 33, with the result that a richer fuel mixture will be supplied to the nozzle to assist the engine in carrying the increased load, and a new position of fuel level and balance will be established in the well 33.

As the load on the engine decreases, as for example, when a vehicle reaches the top of a grade, the engine speeds up an increased volume of air will be drawn through the carburetor increasing the velocity of flow past the fuel nozzle and as a result increasing the suction on well 33. The increased suction on well 33 will result in a lowering of the fuel level until a new balance is established.

In this way it will be seen that the fuel mixture supplied to the nozzle is varied in richness in accordance with throttle position as well as engine speed, and all fuel is cut off during deceleration, providing highly efficient operation and most effective fuel mixtures throughout the entire operation of the engine.

Operation

The detailed operation of the various subcombinations of parts of the device shown in Figures 1 to 3 having been hereinbefore described, a general description of operation will now be given.

A predetermined fuel level is maintained in float chamber 22 by operation of the float controlled valve assembly 16 and 21, and fuel flows from chamber 22 through metering orifice 26 at a rate determined by the difference in fuel level in well 33 and in chamber 22. Owing to the fact that substantially equal atmospheric pressures are maintained on the fuel float chamber and in well 33 through communication with chamber 35, the flow of fuel to well 33 is under the sole influence of gravity, and the rate of flow is determined by the rate of fuel consumption.

The position of valve 44 determines the relative amount of fuel and air passing from well 33 and chamber 47 into chamber 46 and through passage 64 to the fuel nozzle assembly. Since the position of valve 44 is determined by the throttle position, the richness of the mixture will be dependent upon the throttle position as well as the speed of operation of the engine as hereinbefore set forth in detail. Fuel vapors passing from the float chamber will be drawn into chamber 47 from chamber 35, and the proper fuel supply for each given engine condition, in passing through chambers 46 in passages 64, chamber 71, passages 72 and 73 passages 91, and out of the fuel outlet is intimately mixed with the air and reduced to a state of an emulsion of oil and air, the final mixing occurring in passing out through the fuel passages between surfaces 86 and 87 of the nozzle.

Air drawn through the usual cleaner and through intake passages 88 by the suction of the engine flows past the nozzle into control passage 94, and because of the pressure difference between the atmospheric side and the engine side of the fuel nozzle passes the nozzle at high velocity throughout the entire range of the control tube positions from idling to wide open position. At wide open position in which the velocity of flow past the nozzle is lowest, due to the shape of passage 94, the velocity of flow is increased for a substantial distance beyond the nozzle outlet. Due to the circumferential length of the fuel nozzle and the comparatively small space between the walls of passage 94 and the edge of the fuel nozzle outlet, a very intimate contact of the ingoing air streams with the fuel emulsion emitted from the nozzle outlet is secured, which results in minute particles or ribbons of fuel being torn off the fuel mixture or emulsion being projected from the fuel nozzle at approximately right angles to the air stream due to the comparatively higher pressures in passage 94 in operation.

As the particles of fuel emulsion leave the fuel nozzle and enter the air stream, the air in the emulsion expands due to the lower pressures outside of the nozzle tending to atomize the fuel, and the particles are caught in the air stream and carried at sufficiently high velocity through all operating positions of tube 93 for a sufficient distance to reduce the particles of fuel to a sufficiently fine division so they will remain suspended in the air, forming what appears to be a suspension of colloidally divided fuels in air. The fuel mixture produced in this way is a homogeneous dry gaseous mixture of fuel suspended in air in a form that will give effective uniform and complete combustion in the cylinder of an engine without development of detonating pressures.

In the formation of my improved dry gaseous mixture a substantial lowering of the temperatures of the mixture on the engine side of the nozzle occurs giving a maximum weight or density of combustible mixture per unit of space, which as above pointed out, permits operation of internal combustion automobile engines at temperatures of 20 to 25 degrees F. or more below the normal operating temperatures of the same engines when supplied with fuel from the usual carbureting systems, giving considerably improved volumetric engine efficiencies and increased power, and permitting the use of substantially higher compressions without developing excessive temperatures on standard plugs.

Modified form of invention

In the form of invention shown in Figures 4, 5 and 6, modifications of the invention shown in Figures 1 to 3 are disclosed. In this form of invention like characters have been applied to like parts, and the foregoing description may be referred to for a full understanding of the parts not hereinafter described in detail.

In this form of invention it will be noted that metering bushing 24 with the metering orifice 26 located in the upper end of passage 25 in Figure 1 has been eliminated, and an enlarged chamber 151 has been formed adjacent the bottom of bore 27 above closing plug 28, while metering bushing 152 provided with metering opening 153 is screwed into threaded section 28' of the fuel well member 29. This change in location of the metering bushing eliminates occasional formation of air bubbles in the fuel line that occurs with the arrangement shown in Figure 1, thereby improving the operation.

A further modification of the idling adjustment is shown in Figures 4 and 5. In this form of invention the air passage 36 from chamber 34 to chamber 35 is shifted as shown in detail in Figures 4 and 5, and the tubular section of sleeve 51 is enlarged so that when sleeve 51 is forced to its lowermost position by operation of Bowden wire 59, in addition to cutting off air passages 49 from chamber 35 to chamber 47, air passages 36 between chamber 34 and chamber 35 are closed so that fuel only will be drawn from well chamber 33 while sleeve 51 is held in its lowest position. In addition the upper end of guide member 48 is threaded to receive an adjusting collar 154 by means of which sleeve 51 may be adjusted to partially or wholly cover openings 49 in operation thereby varying the proportion of air and permitting adjustment of the relative amount of air drawn through openings 49 into chambers 47 and 46 with relation to the amount of fuel mixture drawn from well 33.

An important improvement over the form of invention shown in Figures 1 to 3, consists in providing means for enriching fuel mixtures during acceleration which permit normal operation of the engine with the leanest possible fuel mixture. In addition the improved arrangement hereinafter described eliminates a lagging present in the construction shown in Figures 1 to 3 when operating on heavier fuels, due to momentary loss of atomization when the throttle is suddenly opened from closed position.

To accomplish these novel and highly useful results the control tube 93 is split into an accelerator section 155 and a throttling section 156. Piston 101 is formed integrally with section 155, and piston 99 is formed integrally with section 156.

A cylindrical guide surface 157 formed on section 156 fits slidably into a bore 158 formed in section 155. A light spring 159 secured by means of pin 161 at its upper end to section 155 is secured at its lower end to nut 162 which secures the upper end of inner metering assembly 163 rigidly to a cross bar 164 formed integrally with lower section 156. Upper cylindrical section 165 of metering pin assembly 163 is slidably guided in a bore formed through nozzle member 85 and threaded extension 83 of nozzle member 69. Formed integrally with cylindrical section 165 is a metering member 168 which extends into chamber 73 and varies the extent of the fuel opening between the top of chamber 73 and passages 92 of the fuel nozzle for a purpose and in a manner that will more fully hereinafter appear. Formed integrally with metering member 168 is a reduced section 169 connected at its lower end to elongated cylindrical section 171 of the metering assembly. A substantial length of the upper end of section 171 fits slidably into the lower end of bore 73 formed in extension 172 of fuel nozzle shank member 68. The lower end of cylindrical member 171 is reduced in diameter and extends through washer 173 and the lower wall of piston 174, and is rigidly secured to piston 174 by means of a securing nut 175. Piston 174 is slidably mounted in a cylinder 176 which is screwed tightly on the threaded lower end of fuel nozzle member extension 172 as indicated at 177. Cylinder 176 is closed at its lower end by means of air tight screw cap 178.

Cylinder 176 fits closely and rotatably in a suitable bore formed in air intake section 77 of casting 2, and piston 176 and cap 178 are tightly secured in position so that by rotating cap 178 and cylinder 176, the threaded shank 68 of the fuel nozzle assembly together with the fuel nozzle may be rotated and adjusted relative to control tube assembly 93 in operation. To provide for holding the nozzle and cylinder assembly in adjusted position, the upper end of cap 178 is serrated and a locking spring 179, the end of which fits in the serrations, of sufficient rigidity to hold the assembly in adjusted position, is secured by means of screws 181 to air intake section 77 of bowl casting 2.

Atmospheric pressure from air intake passage 88 is admitted to the upper side of piston 174 in cylinder 176 through air inlet openings 182.

*Operation*

In operation of the form of invention shown in Figures 4, 5 and 6, under normal operating conditions, the tension of spring 159, and the suction effect of air flowing through passage 94 of the tube assembly 93 will draw throttle section 156 against accelerator section 165 as shown in Figure 4, and the operation is the same as set forth in connection with Figures 1 to 3. It is however to be noted that a peculiar effect is produced on section 156 in operation which necessitates the proper proportioning of the area of holes 103. It has been found in practice that if holes 103 are omitted, that throttle section 156 will move toward rather than away from the fuel nozzle in operation, the movement being the reverse of what would normally be expected. By varying the area of holes 103 the tendency of section 156 to move towards the nozzle in operation may be neutralized or overcome to any desired extent and the proportions are so selected as to maintain a sufficient tendency to move away from the nozzle to maintain parts 156 and 155 in engagement in normal operation.

Metering member 168 is so shaped that a greater area of opening for fuel mixture passage will be established past pin 168 out of chamber 73 than exists between metering pin 45 and the top of fuel well 33 with parts 155 and 156 together. Accordingly in any throttle position with parts 155 and 156 together, the fuel supply to the nozzle will be under control of the metering pin 45 of valve 44.

When, however, the accelerator is operated suddenly to impart an opening movement to the accelerator section 155 of the control tube assembly, piston 174 will resist sudden movement of the throttling section 156 and throttling section 156 will follow section 155 more slowly under the influence of spring 159, at a rate that will be permitted by leakage of air from the upper side of piston 174 to the lower side of the piston in cylinder 176, which will gradually eliminate the resistance due to the partial vacuum formed underneath piston 174, and under the influence of holes 103.

When sections 155 and 156 are separated, metering pin 45 will be shifted with section 155 increasing the opening for fuel between chambers 33 and 46 to the setting proper for the new throttle opening, and beyond the area of opening around metering member 168 at the top of chamber 73. Metering section 168 will accordingly control the rate of fuel mixture supply to the nozzle, more fuel emulsion will accordingly be supplied to the air stream by the nozzle. Throttle section 156 will gradually approach accelerator section 155 due to the tendency of the throttle section to move towards the accelerator section because of the proportions of the parts, and fuel emulsion supply will be increased due to the movement of metering member 168 as throttling section 156 moves toward the accelerating section 155, in this way supplying an effective accelerating mixture to provide for rapid acceleration for the vehicle. Just before section 156 is brought together with section 155 in the new position of parts, the fuel passage area established by member 168 will exceed the area between metering pin 45 and fuel well 33 so that the fuel control will again be under control of metering pin 45, again establishing the leanest satisfactory running mixture for the particular engine speeds and throttle setting.

In addition to providing effective and highly desirable acceleration, it has been found in practice that all tendency for a lag introduced due to momentary cessation of atomization that exists with the heavier forms of fuel when utilizing the form of invention shown in Figures 1 to 3 is eliminated by this arrangement, and highly effective accelerating and efficient normal operation are secured.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by U. S. Letters Patent is:—

1. In combination with the carburetor and throttle of an internal combustion engine, a fuel cut-off valve; and means, operative only when the throttle is in idling position and the pressures on the engine side of the throttle drop below the pressures normally present when the engine is idling, to actuate said valve to completely cut off the fuel supply to the engine; and means mechanically connecting said first mentioned means with the throttle so that opening movement of the latter will cause said cut-off valve to open.

2. A fuel control device comprising means adapted for association with the carburetor and throttle of an internal combustion engine embodying mechanism controlling the fuel supply to the engine; and means, actuated mechanically and movable with the throttle and responsive to pressures on the engine side of the throttle lower than normal idling intake manifold pressures of the engine when the throttle is in idling position, to actuate said mechanism to cut off the fuel supply.

3. The method of forming a homogeneous combustible fuel mixture from hydrocarbon fuels and air which comprises the steps of feeding small particles of the fuel into a rapidly moving air stream, then gradually increasing the velocity of the combined air and fuel stream to a relatively high maximum value, and maintaining the velocity of the air and fuel stream substantially at said maximum value through a considerable distance, thereby causing such fine division and such intimate mixture of the fuel particles in the air that they will remain homogeneously and uniformly suspended to form a dry gaseous mixture of fuel and air at normal atmospheric temperatures.

4. A carburetor for forming a homogeneous combustible fuel mixture from hydrocarbon fuels which comprises means forming a conduit for conveying a rapidly moving air stream, and a feed nozzle for feeding an emulsion of fuel and air in a thin sheet substantially at right angles into said rapidly moving air stream; said conduit tapering inwardly in the direction of the flow from some distance beyond the fuel feeding point to materially increase the velocity of flow, and thereafter tapering outwardly in the direction of flow; said tapered portions intersecting to form a long throat of minimum and approximately constant diameter for maintaining the flow at substantially maximum velocity through a sufficient distance to cause microscopic division and such an intimate mixture of the fuel particles in air that they will remain homogeneously and uniformly suspended in the form of a dry gaseous mixture after said mixture passes from the conduit.

5. In subcombination in a carburetor, means forming a conduit for fuel mixture, an air passage in communication with said conduit, a fuel passage in communication with said conduit, and a common unitary control valve for said passages; said valve embodying a portion for metering fuel into said conduit from said fuel passage, and a portion for governing the flow of air toward said conduit from said air passage, said portions being movable bodily together and so related to each other and to the respective passages that movement of the valve will vary the fuel and air proportions of the mixture which passes into the conduit.

6. In a carburetor having an intake passageway and a throttle member shiftable to control the flow through said passageway, a fuel control valve, a pressure-responsive element in communication with the intake passageway and connected to said fuel control valve, and means for mechanically connecting both said valve and said element to said throttle member, whereby said valve is constantly under the influence of the throttle position and of the pressures existing adjacent the throttle.

7. In a carburetor having an intake passageway and a throttling tube shiftable axially of said passageway, a pressure-responsive element carried bodily by said tube and in communication with the internal passage thereof, and fuel control means connected to said pressure-responsive element.

WILLIAM E. LEIBING.